United States Patent
Speyer

(10) Patent No.: US 7,665,994 B2
(45) Date of Patent: Feb. 23, 2010

(54) DEVICE AND METHOD FOR DEMONSTRATING STAGGER

(75) Inventor: Al Speyer, Hendersonville, TN (US)

(73) Assignee: Bridgestone Americas Tire Operations, LLC

( * ) Notice: Subject to any disclaimer, the term of this patent is extended or adjusted under 35 U.S.C. 154(b) by 691 days.

(21) Appl. No.: 11/298,222

(22) Filed: Dec. 10, 2005

(65) Prior Publication Data

US 2007/0136039 A1 Jun. 14, 2007

(51) Int. Cl.
*G09B 19/00* (2006.01)

(52) U.S. Cl. .................................................... 434/255

(58) Field of Classification Search .............. 434/29, 434/62, 255, 300, 302; 446/23, 78, 95–96, 446/279, 289; 280/47.24, 641, 645, 651, 280/652

See application file for complete search history.

(56) References Cited

U.S. PATENT DOCUMENTS

| | | | | | |
|---|---|---|---|---|---|
| 2,662,777 | A | * | 12/1953 | Wilchek | 280/47.24 |
| 2,721,086 | A | * | 10/1955 | Gorley et al. | 280/47.29 |
| 4,244,595 | A | * | 1/1981 | Sagert | 280/47.29 |
| 4,334,677 | A | * | 6/1982 | Tata | 482/14 |
| 4,729,711 | A | * | 3/1988 | Holopainen | 414/454 |
| 4,995,227 | A | * | 2/1991 | Foster | 56/249 |
| 5,393,081 | A | * | 2/1995 | Mortenson | 280/47.27 |
| 5,867,439 | A | * | 2/1999 | Asakura et al. | 365/222 |
| 6,681,621 | B1 | | 1/2004 | Kluhsman | |
| 2003/0075887 | A1 | * | 4/2003 | Malone, Jr. | 280/30 |
| 2006/0107643 | A1 | * | 5/2006 | Witty | 56/249 |

OTHER PUBLICATIONS

International Search Report; U.S. patent Office; Authorized Officer Giemsa, Falk; Issued Mar. 4, 2007.
Bolles, Bob; Circle Track Tire Selection and Stagger; internet article; URL: http://web.archive.org/web/20051001105240/http://circletrack.com/techarticles/88278/#>; Oct. 2006; pp. 1-3.
Bridgestone; Bridgestone Potenza Fast Facts; internet article; URL:http://web.archive.org/web/20041212013400/ http://bridgestonetire.com/news/us_en/r_20629a.html>; Jun. 30, 21002; pp. 1-1.

* cited by examiner

*Primary Examiner*—Kurt Fernstrom
(74) *Attorney, Agent, or Firm*—Thomas R. Kingsbury

(57) ABSTRACT

In one embodiment a device is provided for visually demonstrating stagger. In this embodiment, the device includes first and second tires coaxially mounted on an axle, wherein the first tire has a smaller diameter than the second tire. The device also includes a member configured to be pushed or pulled by a person. The device may be pushed or pulled on a flat surface, such as a paved road. When the device is pushed or pulled in a forward direction, the first and second tires will rotate at the same rotational speed, but because the second tire has a larger diameter than the first tire, the second tire will travel a greater distance than the first tire during each tire rotation. Thus, the device will move in a curved path.

17 Claims, 3 Drawing Sheets

DEVICE AND METHOD FOR DEMONSTRATING STAGGER

FIELD OF INVENTION

The present application relates to a device for demonstrating stagger. More particularly, the present application relates to a device having two wheels of different diameters to demonstrate stagger.

BACKGROUND

Over the years, professional automobile racing has become increasingly popular and has garnered many new fans. This increased fan base has created a demand for teaching tools that visually demonstrate techniques used in automobile racing. One such technique is known as "stagger."

The performance of racing automobiles on banked tracks is often improved by "staggering" the inside tires as compared with the outside tires. When tires are staggered, such that the inside tires have a smaller diameter than the outside tires, the outside tires will travel farther than the inside tires with each tire revolution, by a distance of $\pi*(D_{large}-D_{small})$, where $D_{large}$ is the larger diameter of the outside tires and $D_{small}$ is the smaller diameter of the inside tires. While this difference is nominal over a short distance, over longer distances the difference in diameters will cause the car to move along a curved path. The tire stagger thus accommodates banked tracks, leading to higher race car speeds and better handling characteristics.

SUMMARY

One embodiment of the present application is directed to a device and method for visually demonstrating stagger. In this embodiment, the device includes first and second tires coaxially mounted on an axle, wherein the first tire has a smaller diameter than the second tire, thereby creating a diameter differential. The device also includes a member configured to be pushed or pulled by a person. The device may be pushed or pulled on a surface, such as a paved road or a floor. When the device is pushed or pulled in a forward direction, the first and second tires will rotate at the same rotational speed, but because of the diameter differential, the second tire will travel a greater distance than the first tire during each tire revolution. Thus, the device will move in a curved path.

In additional embodiments, the tires of the stagger demonstration device may include visual markers to indicate that the tires are rotating at the same rotational speed. Additionally, the device may be pushed on a surface having a straight line marked thereon. The straight line will provide a visual reference to demonstrate that when the device is pushed in the direction of the straight line, it will move along a path that is curved relative to the painted line.

BRIEF DESCRIPTION OF DRAWINGS

In the drawings and description that follows, like elements are identified with the same reference numerals. The drawings are not to scale and the proportion of certain elements may be exaggerated for the purpose of illustration.

DETAILED DESCRIPTION

The following includes definitions of selected terms employed herein. The definitions include various examples and/or forms of components that fall within the scope of a term and that may be used for implementation. The examples are not intended to be limiting. Both singular and plural forms of terms may be within the definitions.

"Axial" or "axially," as used herein, refer to a direction that is parallel to the axis of rotation of a tire.

"Circumferential" and "circumferentially," as used herein, refer to a direction extending along the perimeter of the surface of the annular tread perpendicular to the axial direction.

The present application is directed to a device and method for visually demonstrating stagger. The device is configured such that when it is pushed or pulled in a forward direction, it will move along a curved path.

Figure 1:
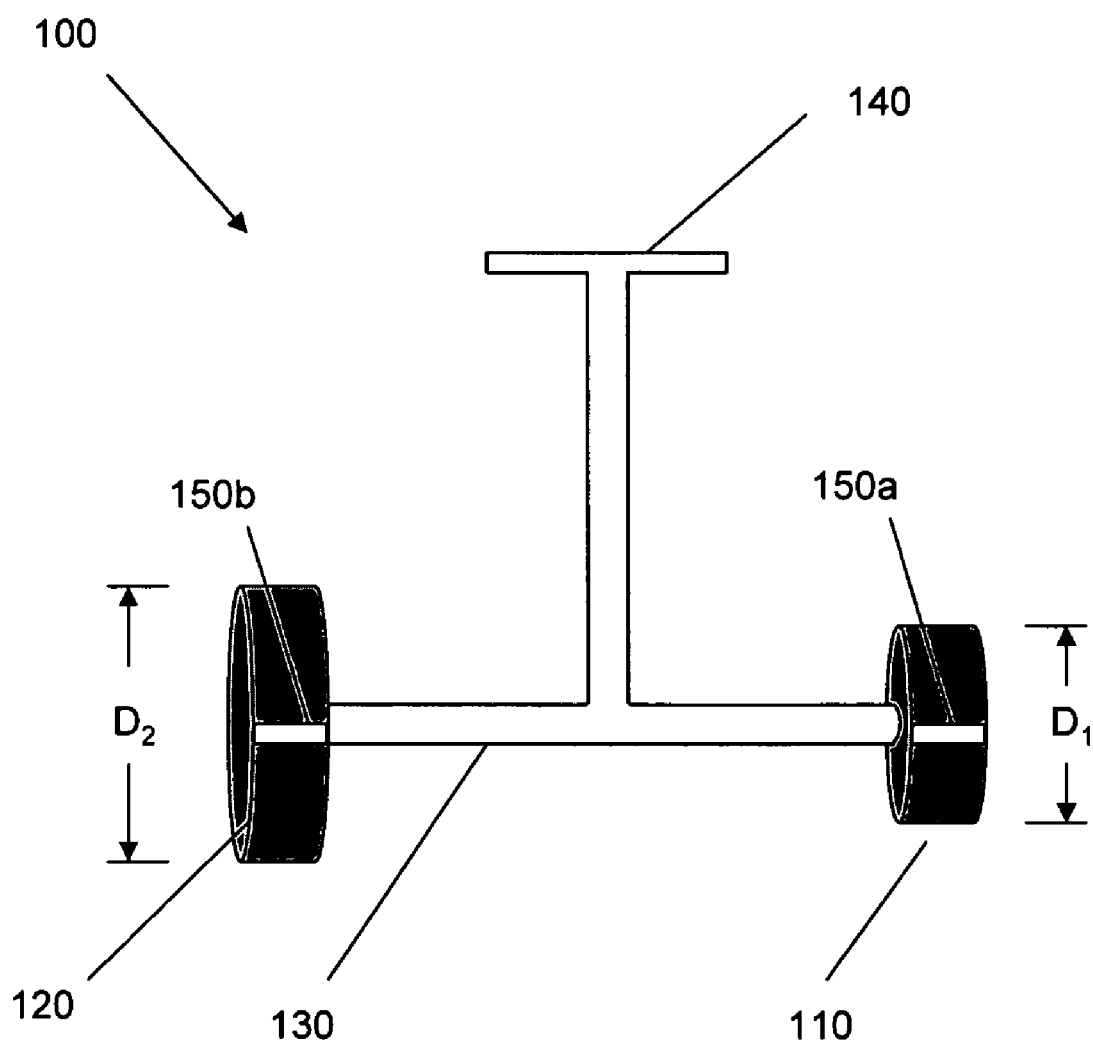
FIG. 1 is a simplified front view of one embodiment of a device 100 for visually demonstrating stagger.

FIG. 1 illustrates a simplified front view of one embodiment of a stagger demonstrating device 100. In this embodiment, first and second tires 110,120 are coaxially mounted on wheels (not shown) which are subsequently mounted on an axle 130. The first tire 110 has a first diameter $D_1$ and the second tire 120 has a second diameter $D_2$ that is greater than the first diameter $D_1$. To achieve this differential between the diameters, a user can employ tires having different dimensions. Alternatively, the user can employ tires have the same dimensions and create a diameter differential by deflating the first tire relative to the second tire.

In the present embodiment, the first and second tires 110, 120 are configured to rotate at the same rotational speed, because they are coaxially mounted on the same axle 130. Because the second tire 120 has a greater diameter $D_2$ then the first diameter $D_1$, the second tire will travel farther than the first tire during each tire revolution. More specifically, during a single revolution, the first tire 110 will travel a distance equal to its circumference $C_1$, which is equal to $\pi*D_1$, and the second tire 120 will travel a distance equal to its circumference $C_2$, which is equal to $\pi*D_2$. Therefore, during each rotation, the second tire will travel an additional distance that is equal to $C_2-C_1$, or $\pi*(D_2-D_1)$.

In one embodiment, the second diameter $D_2$ is at least 0.25 inches greater than the first diameter $D_1$. Therefore, the second tire 120 travels at least $0.25\pi$ inches (or at least approximately 0.785 inches) farther than the first tire 110 during each revolution of the tires 110,120. In another embodiment, the first diameter $D_1$ is approximately 26.84 inches and the second diameter $D_2$ is approximately 27.27 inches. Therefore, the second diameter $D_2$ is approximately 0.43 inches greater than the first diameter $D_1$ and the second tire 120 travels approximately $0.43\pi$ inches (or approximately 1.35 inches) farther than the first tire 110 during each revolution of the tires 110,120. On the Indianapolis 500 racetrack, or a similarly dimensioned racetrack, the second tire 120 would travel approximately 21 feet farther in each turn than the first tire 110.

With continued reference to FIG. 1, the device 100 also includes a member configured to allow a person to push or pull the device 100. In the illustrated embodiment, the member is a T-shaped handle 140. In alternative embodiments (not shown), the member can be a handle of any shape, including, without limitation, an L-shaped handle, a straight handle, or a steering wheel shaped handle. In an additional alternative embodiment (not shown), the member is a harness. In the present embodiment, the handle 140 is directly connected to the axle 130. In an alternative embodiment (not shown), the handle 140 is indirectly connected to the axle 130.

In one embodiment, each of the first and second tires 110, 120 includes at least one visual marker 150a,b to help indicate the rotation of the tires. In the illustrated embodiment, the first tire 110 has a first visual marker 150a and the second tire 120 has a second visual marker 150b at a location that corresponds circumferentially with the location of the first visual marker 150a on the first tire, such that both the first and second visual markers 150a,b reach top dead center at the same time during rotation of the axle 130.

In alternative embodiments, each tire 110,120 includes a plurality of visual markers. The visual markers may be aligned or off-set with respect to each other. Furthermore, the visual markers may have different colors. The visual markers may be painted on the tire or they may be adhesively applied.

Figure 2:
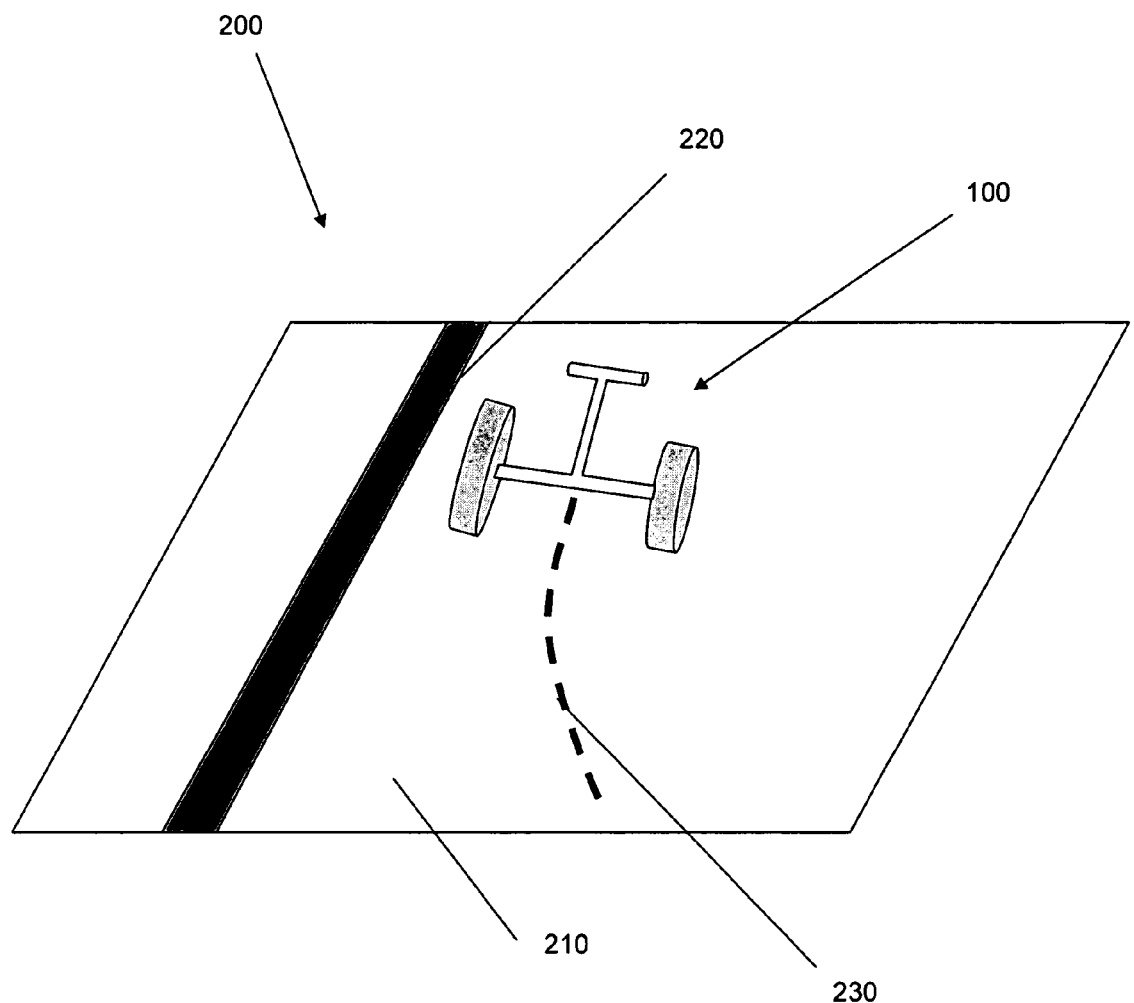
FIG. 2 is a perspective view of one embodiment of a system 200 for visually demonstrating stagger.

FIG. 2 illustrates one embodiment of a system 200 for visually demonstrating stagger. In this embodiment, the system 200 includes a stagger demonstrating device 100 as explained above. The system further includes a surface 210 on which the device 100 may be moved. Examples of surfaces include, without limitation, a flat section of a paved surface or a floor.

In the illustrated embodiment, the surface 210 is marked with a straight line 220 that may serve as a visual reference. The straight line 220 may be painted on the surface 210 or it may be applied by an adhesive. In an alternative embodiment (not shown), a straight object or a series of objects may be used to indicate a straight path. In an alternative embodiment (not shown), the surface 210 is marked with a line that approximates the curved path 230 that the device 100 will follow.

With continued reference to FIG. 2, the device 100 is placed adjacent the straight line 220 such that the first and second tires 110,120 are approximately parallel to the straight line 220. A user then pushes the device 100 in a forward direction that corresponds to the direction of the straight line 220. As the device 100 is moved forward, it travels along a curved path 230 relative to the straight line 220. In one embodiment (not shown), tire 110 or tire 120 or both are configured to apply an indicator on the surface 210 to mark the path of travel 230. Examples of indicators that may be applied include, without limitation, paint or water.

Figure 3:
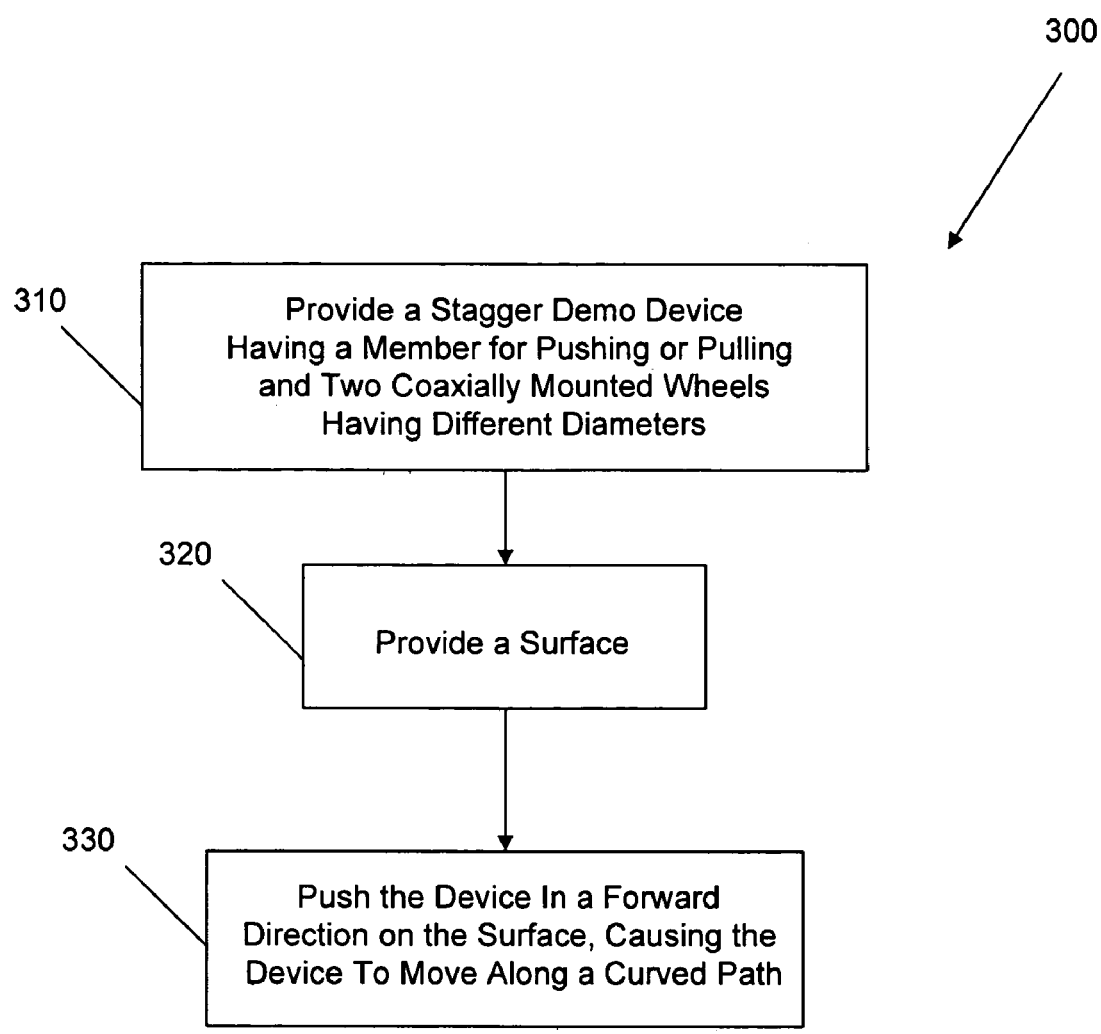
FIG. 3 is a flow chart illustrating one embodiment of a method 300 for visually demonstrating stagger.

FIG. 3 is a flow chart diagram of one exemplary method 300 for visually demonstrating stagger. Initially, a demonstrator provides a stagger demonstration device (step 310). The stagger demonstration device includes a member for pushing or pulling the device and two coaxially mounted wheels having different diameters. The demonstrator next provides a surface (step 320). In one embodiment, the surface is marked with a straight line. In an alternative embodiment, the surface is marked with a curved line that approximates the path the stagger demonstration device will follow. If the surface is marked with a line, the demonstrator may optionally align the device with the marked line.

The demonstrator then pushes the device in a forward direction (step 330). The difference between the diameters of the wheels will cause the device to move along a curved path. The demonstrator may move the device a short distance to show that the stagger may not be visible over short distances. The demonstrator may then continue to move the device over a longer distance to provide a visual indication of the curved path the device follows due to stagger.

While the present application has been illustrated by the description of embodiments thereof, and while the embodiments have been described in some detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus, on the illustrative embodiments shown and described. Accordingly, departures may be made from such details without departing from the spirit or scope of the applicant's general inventive concept.

The invention claimed is:

1. A device for visually demonstrating stagger, the device comprising:
    at least two tires, including a first and second tire, wherein the first tire has a smaller diameter than the second tire, the first and second tires each including at least one visual marker at corresponding circumferential locations, such that during rotation of the tires, the visual marker of each tire reaches top dead center at the same time;
    an axle connected to the first and second tires, such that the first and second tires are coaxial; and
    a member connected to the axle and configured to be pushed or pulled by a person.

2. The device of claim 1, wherein the visual marker is a painted stripe.

3. The device of claim 1, wherein the diameter of the first tire is at least 0.25 inches less than the diameter of the second tire.

4. The device of claim 1, wherein the diameter of the first tire is about 0.43 inches less than the diameter of the second tire.

5. The device of claim 1, wherein the member configured to be pushed or pulled by a person is a handle.

6. A system for demonstrating stagger, the system comprising:
    a surface; and
    a device configured to be pushed or pulled by a person, wherein the device includes:
        an axle;
        a first tire having a first diameter, configured to be axially mounted on the axle;
        a second tire having a second diameter that is larger than the first diameter, the second tire configured to be axially mounted on the axle, opposite the first tire, wherein the first and second tires each have at least one visual marker at corresponding circumferential locations, such that when the first and second tires are rotated on the axle, the visual markers reach top dead center at the same time; and
        a member connected to the axle and configured to be pushed or pulled by a person.

7. The system of claim 6, wherein the surface is a section of paved road having a straight line marked thereon.

8. The system of claim 7, wherein the device is configured to be pushed or pulled on the section of paved road, such that if the device is pushed or pulled in the direction of the straight line, the difference between the first and second diameters cause the device to move along a curved path.

9. The system of claim 6, wherein the second diameter is at least 0.25 inches larger than the first diameter.

10. The system of claim 6, wherein the second diameter is about 0.43 inches larger than the first diameter.

11. The system of claim 6, wherein the member configured to be pushed or pulled by a person is a handle.

12. A method for visually demonstrating stagger, the method comprising:
    providing a surface;
    providing a device having first and second co-axially mounted tires, wherein the second tire has a larger dimension than the first tire;

providing at least one visual marker on each of the first and second co-axially mounted tires at corresponding circumferential locations, such that during rotation of the tires, the visual marker of each tire reaches top dead center at the same time; and pushing the device on the surface in a forward direction, wherein the larger dimension of the first tire causes the device to move along a curved path.

13. The method of claim 12, further comprising marking each of the first and second tires with at least one visual marker at corresponding locations.

14. The method of claim 12, wherein the device includes a handle configured to be pushed or pulled by a person.

15. The method of claim 12, wherein a diameter of the second tire is at least 0.25 inches greater than a diameter of the second tire.

16. The method of claim 12, wherein a diameter of the second tire is about 0.43 inches greater than a diameter of the second tire.

17. The method of claim 12, further comprising marking the surface with a straight line, such that when the device is pushed, it will travel along a path that is curved relative to the marked line.

* * * * *

UNITED STATES PATENT AND TRADEMARK OFFICE
CERTIFICATE OF CORRECTION

PATENT NO.      : 7,665,994 B2                              Page 1 of 1
APPLICATION NO. : 11/298222
DATED           : February 23, 2010
INVENTOR(S)     : Al Speyer It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1086 days.

Signed and Sealed this

Twenty-eighth Day of December, 2010

David J. Kappos
*Director of the United States Patent and Trademark Office*